March 30, 1948. F. H. LOFTUS 2,438,812
FURNACE AND METHOD OF OPERATING SAME
Filed July 31, 1943 4 Sheets-Sheet 1
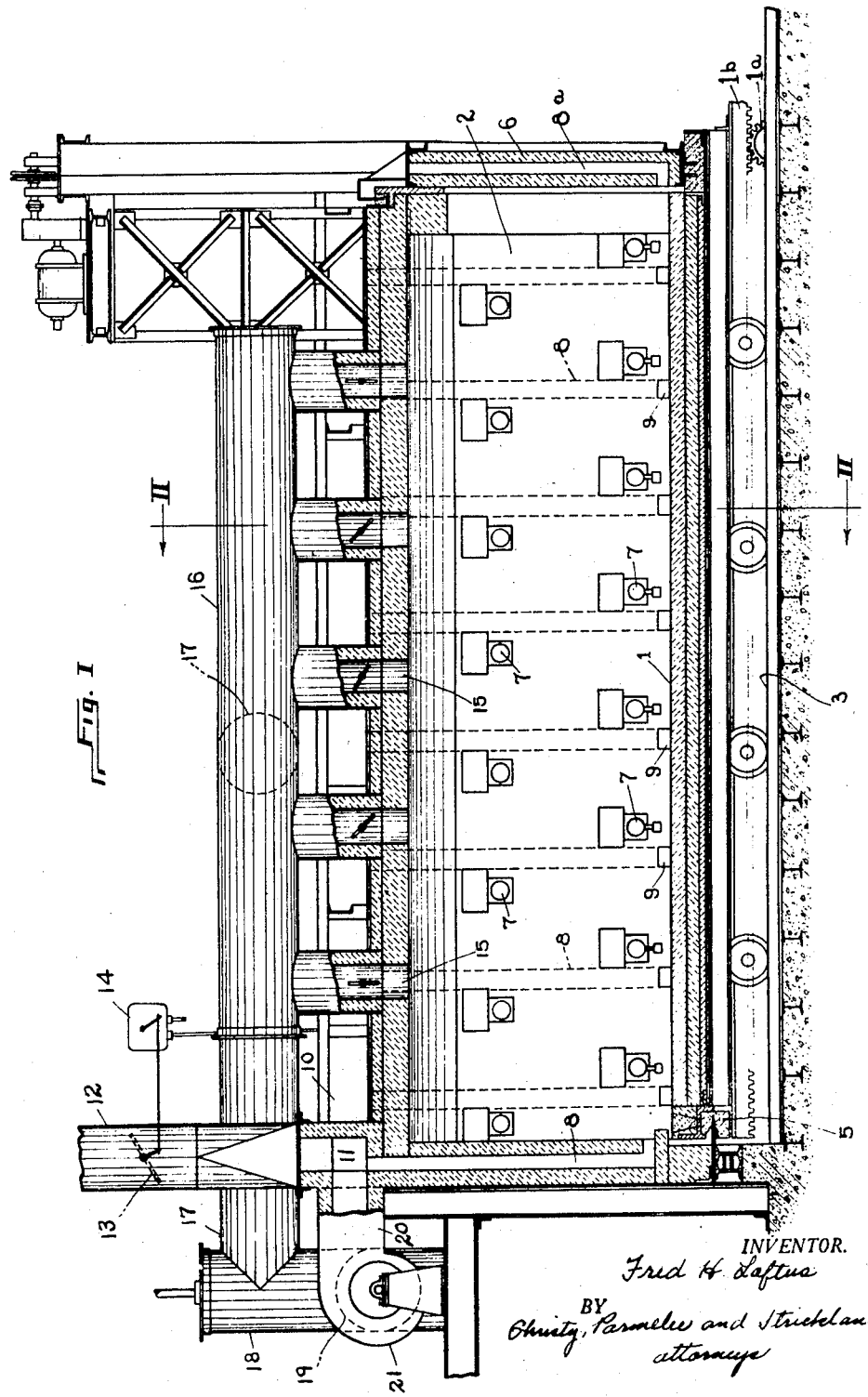
INVENTOR.
Fred H. Loftus
BY Christy, Parmelee and Strickland
attorneys March 30, 1948. F. H. LOFTUS 2,438,812
FURNACE AND METHOD OF OPERATING SAME
Filed July 31, 1943 4 Sheets-Sheet 2
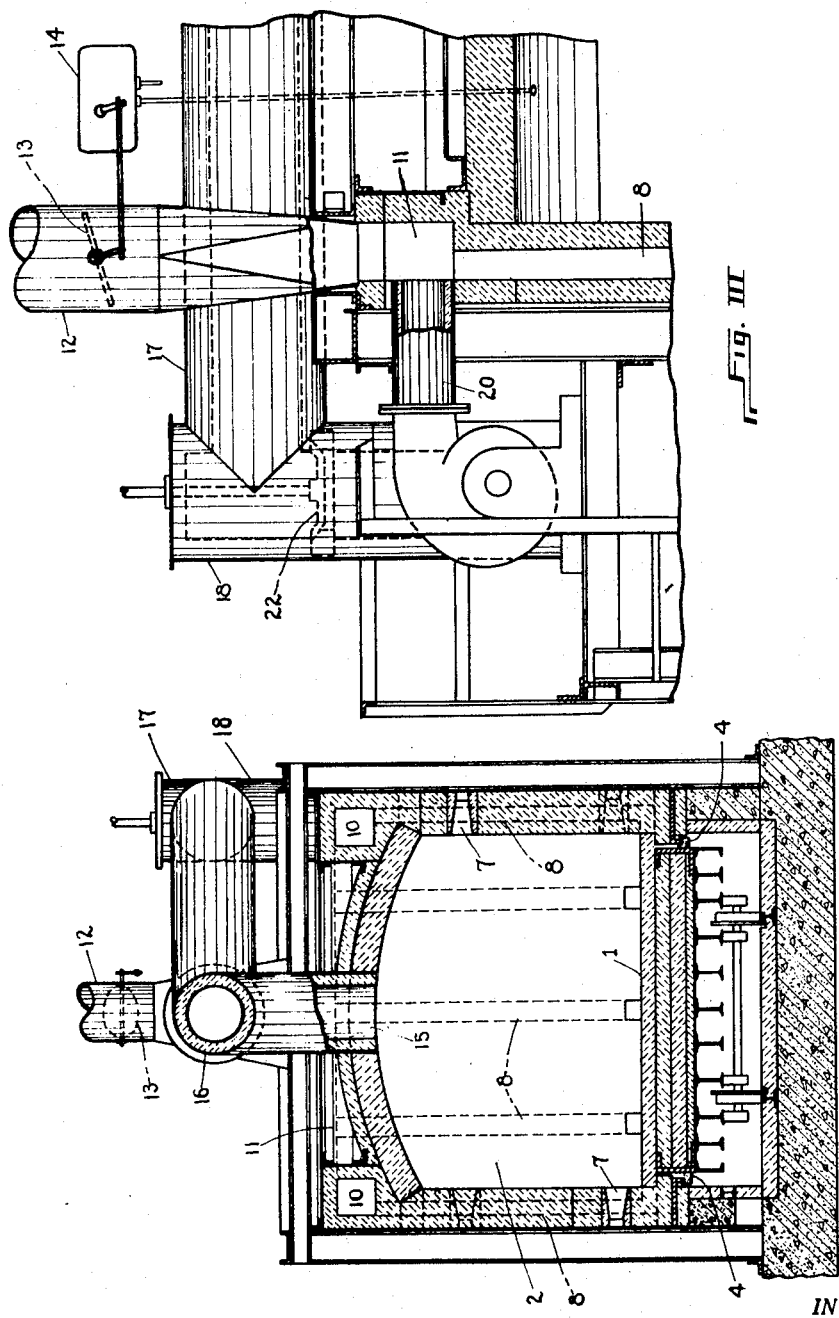
INVENTOR.
Fred H. Loftus
BY
Christy, Parmelee and Strickland
attorneys

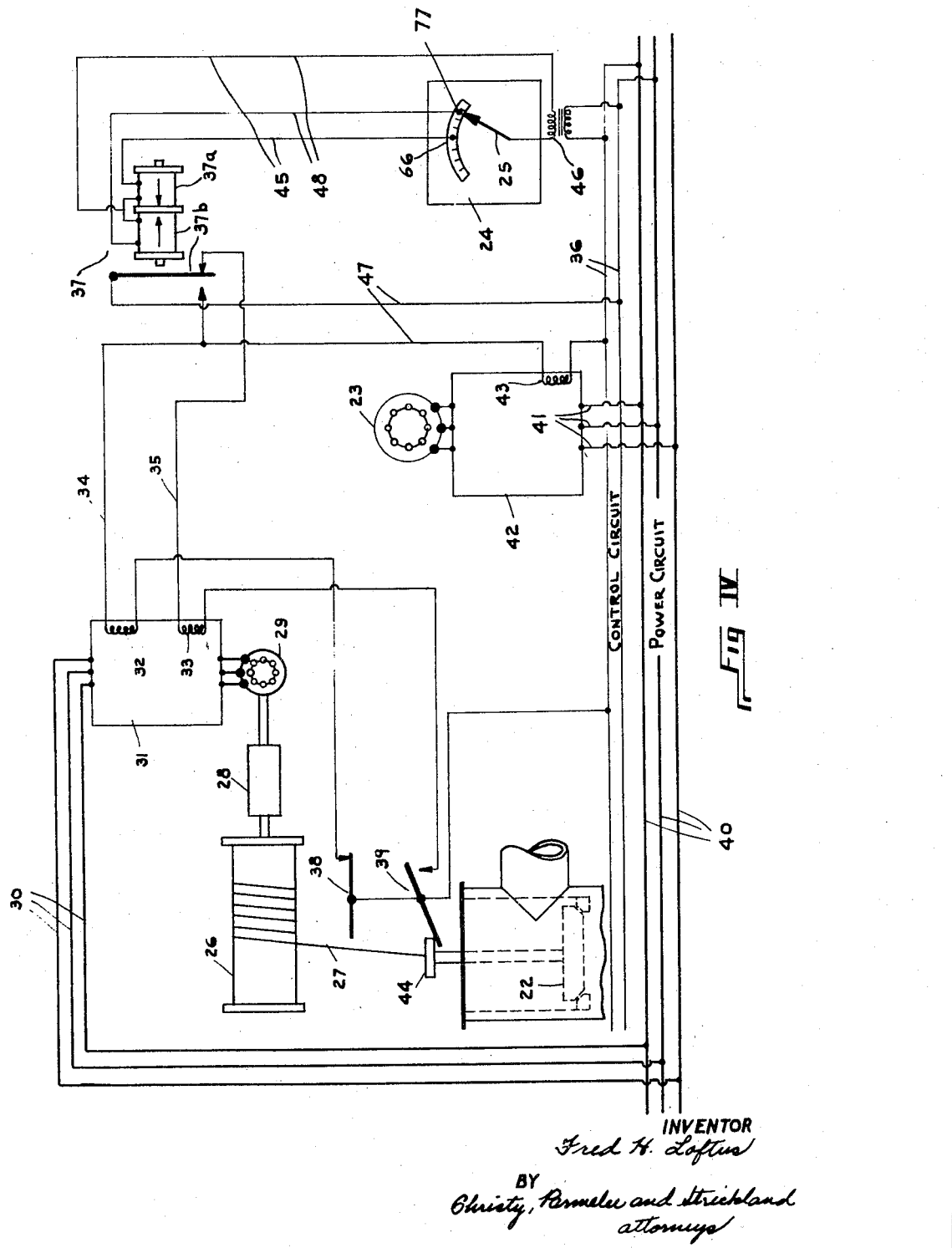

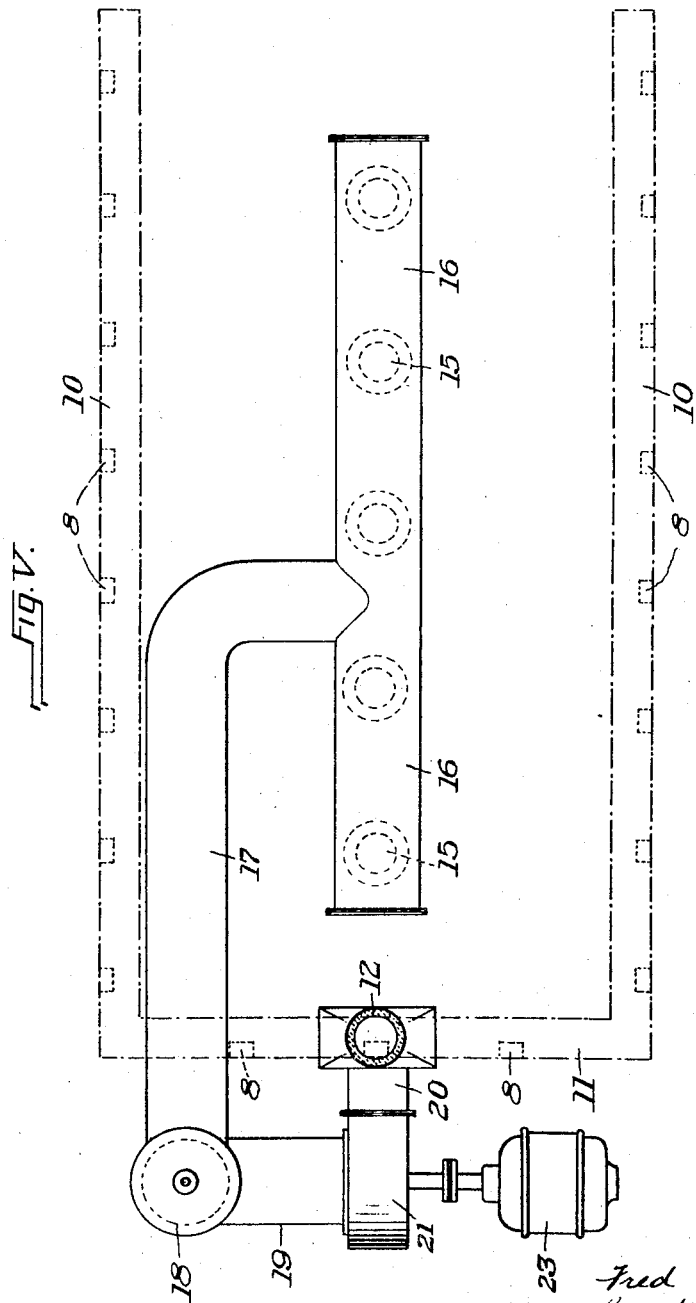

Patented Mar. 30, 1948

2,438,812

UNITED STATES PATENT OFFICE 2,438,812

FURNACE AND METHOD OF OPERATING SAME

Fred H. Loftus, Mount Lebanon, Pa.

Application July 31, 1943, Serial No. 496,866

11 Claims. (Cl. 263—43)

The invention relates to furnaces or lehrs for heating, heat treating, or annealing articles formed of metal, glass, or other material requiring heat treatment.

In the operation of such furnaces, it is desirable in many cases to maintain a circulation of the hot gases within work-containing chamber of the furnace, to insure uniform temperature conditions throughout the extent of said chamber. Additionally, it is desirable to maintain predetermined conditions of pressure of the gaseous atmosphere within the furnace chamber, and the problem has been to obtain these desiderata while regulating the rate at which heat is generated within the furnace, as is necessary to provide the desired thermal cycle for the work being treated. The invention consists both in furnace structure and in method of operation, whereby the desired ends are gained with maximum economy, with facility of control, and with minimum supervision.

The invention will in exemplary way be illustrated and described as it is embodied and practiced in a car-bottom furnace. In the accompanying drawings:

Fig. I is a view of the furnace in medial, longitudinal section;

Fig. II is a view of the furnace in transverse section, on the plane II—II of Figure I;

Fig. III is a view in side elevation and to larger scale of a portion of the flue system of the furnace, showing diagrammatically in association therewith certain automatic pressure controlling instrumentalities;

Fig. IV is a schematic view of the control apparatus of the furnace and wiring diagram; and Fig. V is a diagrammatic view in plan of the flue and gas-circulating system of the furnace, certain of the flues included in the furnace body proper being shown conventionalized in broken lines for clearer illustration.

As above mentioned, the invention will be described as it is embodied in a car-bottom furnace, say a car-bottom furnace for annealing steel castings, with the understanding that in the appended claims the word "furnace" shall include furnaces and lehrs of other construction for the heating, heat-treatment or annealing of articles of glass, ceramic material and other material than steel.

Turning to the drawings, the steel castings (not shown) to be annealed are placed on the refractory floor of a car 1 that forms the floor of the work-containing chamber 2 of the furnace. In order to facilitate loading and unloading the work, the car is removable from the furnace, the car being moved on rails 3 by means of a motor-driven pinion 1a which meshes with a gear-rack 1b secured to and extending longitudinally of the car chassis. When the car with its burden is positioned within the furnace, the two side edges and the rear edge of the car are sealed to the furnace walls, by means of sand seals 4 and 5, and in known way the door 6 at the front of the furnace is sealed both to the car body and to the furnace walls, whereby when the furnace is in operation the annealing chamber 2 is functionally the same substantially as a closed chamber that is integrally constructed of refractory material.

Means are provided for supplying hot gases to the annealing chamber 2, and in this case the hot gases comprise the products of combustion of fuel burned within the annealing chamber. More particularly, burners 7 are provided in the opposite side walls of the chamber 2, and these burners direct burning jets of fuel and air into the furnace and upon and around the work undergoing treatment. The rate at which the fuel and air are delivered to the burners is regulated, so that heat supplied to the work is varied in such manner as to provide the desired annealing cycle.

The spent or waste gases are led away from the annealing chamber by means of a system of outgo flues that communicates with a valve-controlled stack or other outlet. The flue system comprises vertical flues 8 formed in the side and end walls of the furnace. The flues 8 open through ports 9 located adjacent to the bottom of the annealing chamber and discharge into ducts 10 extending above and longitudinally of the furnace side walls. The ducts 10 lead into a transverse header 11 that communicates with a stack 12. The refractory lining of the furnace door 6 includes flues 8a, but as distinguished from the flues 8, the door flues 8a in this case discharge at their upper ends into the open air. This venting of the door flues does not materially affect the control of pressure within the furnace, as described below. Indeed, the provision of the flues 8a in the door is not a matter of controlling importance insofar as my invention is concerned.

It is desirable that the gases within the annealing chamber 2 shall be maintained at super-atmospheric pressure in order that an adequate quantity of hot gases shall be held in intimate contact with and circulated among the castings (not shown) which form the furnace charge. Under such conditions, the temperature is held at uniform value throughout the extent of the work-containing chamber 2 of the furnace; the annealing effect is maintained uniform throughout all the charge or work in the furnace; and infiltration of air from the outer atmosphere is prevented. Means for controlling the pressure within the chamber 2 comprise a butterfly valve or damper 13, and pressure control apparatus 14 for regulating the position of such valve in accordance with variation in the pressure of the gases within chamber 2. The pressure control apparatus is a piece of equipment familiar to furnace operators and need not be herein dwelt upon.

No difficulty is encountered in establishing and maintaining the desired conditions within the furnace during that portion of the annealing cycle in which a high rate of combustion is maintained. When, however, the rate of combustion is reduced to a relatively low value, the same situation does not exist—it is difficult (because of the relatively small quantity of hot gases generated by the combustion of the reduced quantity of fuel supplied to the burners) to maintain the desired circulation of gases within the annealing chamber, and to maintain uniform temperature conditions throughout all of the furnace charge. It is to a remedy of this objectionable circumstance of furnace operation that the invention is directed.

In a wall of the furnace chamber 2, preferably in the roof thereof, an auxiliary outlet or flue is provided and from such outlet a passage extends to the flue system at a point on the furnace side of the valve 13. In this case, the auxiliary outlet, or flue comprises five damper-equipped openings 15 that lead into a manifold 16, and the passage to the flue system is formed by a succession of duct elements 17, 18, 19, 20 that leads to the transverse header 11. In such passage a mushroom valve 22 is arranged at a point spaced from the point at which the passage enters the header 11 of the flue system, and a blower or fan 21 is located in the passage at a point between said header and said mushroom valve. The blower or fan is driven by an electric motor 23 (Figs. IV and V), and serves when in operation to draw gases from the top of the annealing chamber and to inject them under augmented pressure into the flue system. The direction in which the so-circulated gases move, after entering the flue system, is counter to the normal direction of flow of the gases through the ducts 10 and flues 8 of the system, with the result that a back pressure is built up in the gases in the system. Such back pressure produces a reverse flow of gases through the same flues 8 and ports 9 that form the normal outlets for the spent gases of the furnace, and herein lies an important and essential feature of the invention.

It will be understood that when the combustion rate of the furnace is so far reduced that inadequate circulation of gases exists within the furnace chamber, the valve 22 is opened and the fan 21 is set in operation, establishing at increased pressure a continuous, reverse circulation of gases within the flue system and furnace chamber. The position of the valve 13 is automatically varied, to regulate and maintain the resistance to the escape of gases into the stack at such value that the desired circulation is held in the annealing chamber.

While it is contemplated that the valve 22 and the fan motor 23 may be manually controlled, means are advantageously provided for automatically operating these members of the furnace organization, and such means are functionally tied into the program control equipment of the furnace.

In the nomenclature of the art the program of the furnace refers to the entire heat-treating procedure to which a charge of work is subjected. It covers the successive temperatures to which the work is heated and cooled, as well as the rate of firing and heating and the time interval at which the work is maintained at given temperatures and cooled. Several types of program control apparatus are well known in the art and may be obtained on the open market. Suffice herein to say that the apparatus includes means for regulating and proportioning the air and fuel delivered into the furnace, with the effect that the temperature of the work within the furnace is increased at specified rate to a predetermined value, held at such value for a predetermined interval of time, then increased, or decreased, at specified rate to another value and there maintained for a predetermined time, or carried immediately to still another value, and so on until the cycle of treatment specified for the work has been completed.

In accordance with the present invention, means are provided for automatically operating the fan 21 and valve 22 in coordination with the program control apparatus, whereby, when the program control apparatus effects a predetermined reduction in the firing rate, necessary to establish the lower temperature phases or cooling gradients in the heat-treating cycle, the valve 22 will open and the fan 21 will be set in operation, to augment the circulation of gases within the furnace and so aid the program control apparatus in effecting, uniformly throughout the work, the desired thermal conditions. The program control apparatus includes an instrument provided with means that open and close electric circuits to means for effecting regulation of the fuel delivered to the furnace. An automatic ratio regulator adjusts the air delivered to the burners, to maintain a definite proportion between the quantity of air and quantity of fuel delivered into the furnace. The means last mentioned include a member that moves in accordance with variations in the temperature within the furnace, and it is with such member that two contacts 26 and 27 are organized to control the operation of the fan 21 and valve 22.

Referring to Fig. IV the reference numeral 24 is applied to a diagrammatic representation of an instrument of the program control apparatus, having an arm 25 that swings clockwise or counterclockwise, according as the temperature within the furnace rises or falls. Within the range of such swing the two contacts 66 and 77 are positioned, the contact 66 being located in the range of swing at the point where the furnace temperature is at the low critical value, the value at which the combustion rate is reduced to the point where the valve 22 must be opened and fan 21 set in operation to provide an adequate circulation of hot gases within the furnace. The contact 77 is located at the point within range of swing where the combustion rate in the furnace is sufficient to produce adequate circulation of hot gases without the operation of the fan.

Means for opening and closing the valve 22 comprise a drum 26 upon which is wound a cable 27, with one end of the cable extending from the drum and secured to the stem of valve 22

The drum is adapted to be rotated through a gear-box 28, by means of an electric motor 29, connected to an electric power circuit 40 by leads 30 that include a remote controller 31 of the double acting type. The controller 31 includes two actuating-and-holding coils 32 and 33 adapted to be alternately energized by the closing of circuits 34 and 35, respectively, with a control circuit 36. The circuits 34 and 35 are alternately opened and closed by means of a double acting relay 37, and such circuits include limit switches 38 and 39, respectively. When the valve 22 is closed, an element 44 on the stem of the valve engages and holds the limit switch 39 in open position, whereby the energizing circuit 35 of the valve-operating motor 29 remains open, regardless of the position which the armature of relay 37 may occupy at the time. While these conditions exist, the limit switch 38 stands in closed position, so that when the relay 37 is actuated, to close control circuit 34, the motor 29 is energized, and rotates the drum 26 in such direction as to open the valve 22, the valve-opening rotation of the drum continuing until the element 44 on the valve stem engages and opens the limit switch 38, whereupon the operation of the motor is arrested, with the valve in open position. As in such operation the valve stem rises, the element 44 moves from contact with the limit switch 39. Switch 39 closes, and the circuit 35 is then adapted to be energized by the movement of relay 37 into alternate position, with the consequence that the motor 29 rotates the drum 26 in opposite direction and closes the valve 22, restoring the parts to the positions in which they are shown in Fig. IV.

The energizing circuit 41 of the fan motor 23 includes a remote controller 42 whose actuating-and-holding coil 43 is connected through the relay 37 and leads 47 to the control circuit 36. The organization is such that, when the valve 22 is opened, the fan motor 23 is energized and is held in operation as long as the valve remains open.

In Fig. IV the contact element 25 is shown in engagement with the contact 77 which is coordinated with the furnace temperature at which and above which the hot gases generated within the furnace are adequate in volume to insure proper circulation. Under such circumstances the valve 22 stands in closed position, with the limit switch 39 holding the valve-operating motor control circuit open, while the relay 37 holds the control circuit 47 of the fan motor 23 open. The valve 22 remains closed and the fan motor 23 remains at rest so long as the temperature within the furnace remains above the value at which, because of low firing rate, recirculation of gases is required. As in the operation of the furnace the firing rate is reduced, to decrease furnace temperature, the contact element 25 swings counterclockwise, and when the furnace temperature drops to critical valve (critical with respect to gas circulation within the furnace), the contact 66 is engaged. Such engagement closes the energizing circuit 45 to the solenoid 37a of relay 37, the electrical connection of circuit 45 to control circuit 36 being through a transformer 46. The energizing of coil 37a swings the armature of the relay 37 from illustrated position into its alternate position, closing control circuit 34 of the valve-operating motor 29, and the control circuit 47 of the fan motor. The valve 22 is opened and the fan motor is set in operation, thereby establishing the desired recirculation of hot gases within the furnace. So long as the temperature and rate of combustion within the furnace remain at or below such critical value, the fan 21 remains in operation, and the valve 22 remains open, it being understood that the member 44 on the stem of the open valve engages and holds limit switch 38 in open position.

When the furnace temperature rises again, as it may do under the influence of the program control apparatus, to the value at which the contact element 25 engages the contact 77, the energizing circuit 48 of the relay solenoid 37b is closed, and the relay armature moved back to the position in which it is shown. This opens the control circuit 47 of the fan motor and closes the control circuit 35 (the limit switch 39 then being closed) of the valve-operating motor. The fan comes to rest, and the drum 26 rotates, paying out cable 27, until the descending valve 22 reaches closed position, at which time the member 44 on the valve stem will have opened the limit switch 39 and arrested the valve-seating operation of the motor 29. And so the valve 22 and fan 21 are automatically operated to establish and interrupt as need be the recirculating flow of the hot gases within the furnace.

In the furnace described and in the operation thereof are centered the particularly effective improvements in structure and in method of operation that are defined in the appended claims, and it will be understood that within the terms of the claims various modifications and refinements in the structure and method of operation are held in contemplation.

I claim as my invention:

1. In a heating or heat-treating furnace, the combination of means for supplying hot gases to the work-containing chamber of the furnace, a valve-controlled outlet for the waste gases of the furnace, a system of outgo flues opening through the side walls of said chamber and communicating with said outlet, a passage leading from the top of said chamber to said flue system, and means in said passage for drawing gases from the top of said chamber and propelling them under augmented pressure into said flue system and thence into said chamber counter to the normal direction of flow of the waste gases in the system, thereby augmenting the circulation of the gases in said furnace chamber.

2. In a heating or heat-treating furnace, the combination of means for supplying hot gases to the work-containing chamber of the furnace, a valve-controlled outlet for the waste gases of the furnace, a system of outgo flues opening through the side walls of said chamber and communicating with said outlet, means for automatically regulating the flow-controlling position of the valve in said outlet in accordance with variations in the pressure of the gases within said chamber, a passage leading from the top of said chamber to said flue system at a point on the furnace side of said valve, and means in said passage for drawing gases from the top of said chamber and propelling them under increased pressure into said flue system and thence into said chamber counter to the normal direction of flow of the waste gases in the system, thereby augmenting the circulation of the gases in said furnace chamber.

3. The method herein described which comprises passing hot products of combustion through the work-containing chamber of a heating or heat-treating furnace and leading products of combustion from such chamber through outgo flues to an outlet, and occasionally establishing a reverse flow of the products in said flues and reintroducing the products from the flues into said chamber.

4. The method herein described which comprises passing hot products of combustion through the work-containing chamber of a heating or heat-treating furnace, and when the temperature within the furnace is at or above an upper critical value leading products of combustion from such chamber through outgo flues to an outlet, and establishing when the temperature within the furnace is at or below a lower critical value a reverse flow of the products of combustion in said flues and reintroducing the products from the flues into said chamber.

5. In a heating or heat-treating furnace, the combination of a work-containing chamber, means for supplying hot gases to said chamber, an outlet, outgo flues for leading gases from said chamber to said outlet, an auxiliary passage including a fan for leading gases from said chamber and introducing them through said flues back into said chamber, a motor for driving said fan, and means responsive to lower and upper critical values of furnace temperature for energizing and de-energizing said fan motor.

6. In a heating or heat-treating furnace, the combination of a work-containing chamber, means for supplying hot gases to said chamber, an outlet, outgo flues for leading gases from said chamber to said outlet, an auxiliary passage including a fan for leading gases from said chamber and introducing them through said flues back into said chamber, a motor for driving said fan, a furnace program control instrument, and means organized with said instrument for effecting at lower and upper critical values of furnace temperature the energizing and de-energizing said fan motor.

7. In a heating or heat-treating furnace, the combination of a work-containing chamber, means for supplying hot gases to said chamber, an outlet, outgo flues for leading gases from said chamber to said outlet, an auxiliary passage including a fan for leading gases from said chamber and introducing them through said flues back into said chamber, a motor for driving said fan, a valve in said passage, means for opening and closing said valve, and means responsive to lower and upper critical values of furnace temperature for energizing and de-energizing said valve-operating means and said fan motor.

8. In a heating or heat-treating furnace, the combination of a work-containing chamber, means for supplying hot gases to said chamber, an outlet, outgo flues for leading gases from said chamber to said outlet, an auxiliary passage including a fan for leading gases from said chamber and introducing them through said flues back into said chamber, a motor for driving said fan, a valve in said passage, means for opening and closing said valve, a furnace program control instrument, and means organized with said instrument for effecting at lower and upper critical values of furnace temperature the energizing and de-energizing of said valve-operating means and said fan motor.

9. The method of operating a furnace of the class described including a work-containing chamber, which method comprises supplying hot gases to said chamber to heat the work contained therein, leading gases by way of outgo flues from said chamber to an outlet and maintaining a circulation of gases in the chamber, reducing the quantity of hot gases supplied to said chamber as the work reaches specified heated condition, drawing a stream of gases from said chamber through an auxiliary flue and delivering such stream under augmented pressure into said outgo flues and effecting reverse flow of the gases through said outgo flues into said chamber to maintain circulation of gases in the chamber while the supply of hot gases thereto is reduced.

10. The method of operating a furnace of the class described including a work-containing chamber, which method comprises firing said chamber to heat the work contained therein, leading the hot products of combustion by way of outgo flues from said chamber to an outlet and maintaining a circulation of hot products of combustion in the chamber, reducing the rate of firing said chamber when the work reaches specified heated condition, drawing a stream of products of combustion from said chamber through an auxiliary flue and delivering such stream under augmented pressure into said outgo flues and effecting reverse flow of the products of combustion through said outgo flues into said chamber to maintain circulation of products of combustion in the chamber while the firing rate is reduced.

11. In a heating or heat-treating furnace, the combination of means for firing the work-containing chamber of the furnace, a valve controlled outlet for the waste gases of the furnace, means for automatically regulating the flow-controlling position of the valve in said outlet in accordance with variations in the pressure of the gases in said chamber, outgo flues opening through the walls of said chamber and communicating with said outlet, an auxiliary flue opening from the top of said chamber and standing in communication with said outgo flues at points on the furnace side of said valve, and means effective when the firing of said chamber is reduced for drawing gases through said auxiliary flue and directing said gases under augmented pressure through said outgo flues into said chamber.

FRED H. LOFTUS.

REFERENCES CITED

The following references are of record in the file of this patent:

UNITED STATES PATENTS

| Number | Name | Date |
|---|---|---|
| 1,837,779 | Kneass | Dec. 22, 1931 |
| 1,999,513 | Morrison | Apr. 30, 1935 |
| 2,214,582 | Hansen | Sept. 10, 1940 |
| 2,252,323 | Krogh | Aug. 12, 1941 |

FOREIGN PATENTS

| Number | Country | Date |
|---|---|---|
| 483,206 | Great Britain | Apr. 13, 1938 |